United States Patent [19]

Buday et al.

[11] Patent Number: 5,568,802
[45] Date of Patent: Oct. 29, 1996

[54] VERTICAL OVEN

[76] Inventors: Gene Buday, 23902 Taranto Bay, Laguna Niguel, Calif. 92677; David L. Baron, 546 Rosemont Ave., Pasadena, Calif. 91103; Jonathan D. Martin, 12033 N. Organ Pipe Ck., Fountain Hills, Ariz. 85268

[21] Appl. No.: 342,177

[22] Filed: Nov. 18, 1994

[51] Int. Cl.⁶ .................................................. F24C 15/32
[52] U.S. Cl. ........................ 126/21 A; 99/476; 99/443 C
[58] Field of Search .............................. 126/21 A, 265, 126/266; 99/443 C, 476; 432/141, 142

[56] References Cited

U.S. PATENT DOCUMENTS

| | | | |
|---|---|---|---|
| 1,633,236 | 9/1923 | Troiel | 198/465.3 |
| 1,837,605 | 12/1931 | Baker | 198/465.3 |
| 1,894,688 | 1/1933 | Icre | 198/465.3 |
| 3,127,499 | 3/1964 | Savio | 219/400 |
| 3,261,650 | 7/1966 | Stromquist | 126/21 A |
| 3,312,811 | 4/1967 | Shanklin | 219/388 |
| 3,502,020 | 3/1970 | Bressickello | 219/388 |
| 3,658,047 | 4/1972 | Happel | 126/21 A |
| 3,779,361 | 12/1973 | Schmitt | 198/24 |
| 3,847,069 | 11/1974 | Guibert | 99/443 R |
| 3,884,213 | 5/1975 | Smith | 126/21 A |
| 3,993,189 | 11/1976 | Khoylian et al. | 198/469 |
| 4,034,661 | 7/1977 | Boosalis et al. | 99/339 |
| 4,072,093 | 2/1978 | Zimmer et al. | 99/443 R |
| 4,154,861 | 5/1979 | Smith | 426/466 |
| 4,164,391 | 8/1979 | Howard et al. | 432/124 |
| 4,191,881 | 3/1980 | Ahlgren et al. | 219/388 |
| 4,262,586 | 4/1981 | Miller et al. | 99/345 |
| 4,354,549 | 10/1982 | Smith | 126/21 A |
| 4,508,025 | 4/1985 | Schultz | 99/353 |
| 4,644,136 | 2/1987 | Watchman | 219/400 |
| 4,751,876 | 6/1988 | Escamilla | 99/353 |
| 4,767,639 | 8/1988 | Orii | 426/523 |
| 5,030,809 | 7/1991 | Buday | 219/388 |

FOREIGN PATENT DOCUMENTS 1124382  6/1956  France .................................. 126/21 A

OTHER PUBLICATIONS

Holman Cooking Equipment, "Proveyer," Saco, Maine–Advertisement of 4 pages, No Date.
Middleby Marshall, "Direct Gas Fired or Electrical Heated Conveyor Oven" –Advertisement of 2 pages, No Date.
Nu–Vu Food Service Systems, "Profit Maker Series," Menominee, Michigan–Advertisement of 2 pages, No Date.

Primary Examiner—Carroll B. Dority
Attorney, Agent, or Firm—Gene Buday; David L. Baron; Jonathan D. Martin

[57] ABSTRACT

An improved vertical conveyor oven is provided which facilitates the flow of heated air within the oven. The oven includes a housing having a first open end, side walls and a rear wall. An access door secured to the housing at the housing first open end. A perimeter ducting system is formed within the housing, defining an interior heating chamber. The ducting system includes a first portion disposed about and extending inwardly from the housing side walls and rear wall, and a second portion disposed upon and extending inwardly from the access door. A combustion chamber is provided within the housing below the interior heating chamber. A heat circulation fan is provided within the housing above the interior heating chamber. The heat circulation fan operates to draw heated air from the combustion chamber upward through the heating chamber and downward between the ducting system and the housing, exterior to the heating chamber.

22 Claims, 3 Drawing Sheets

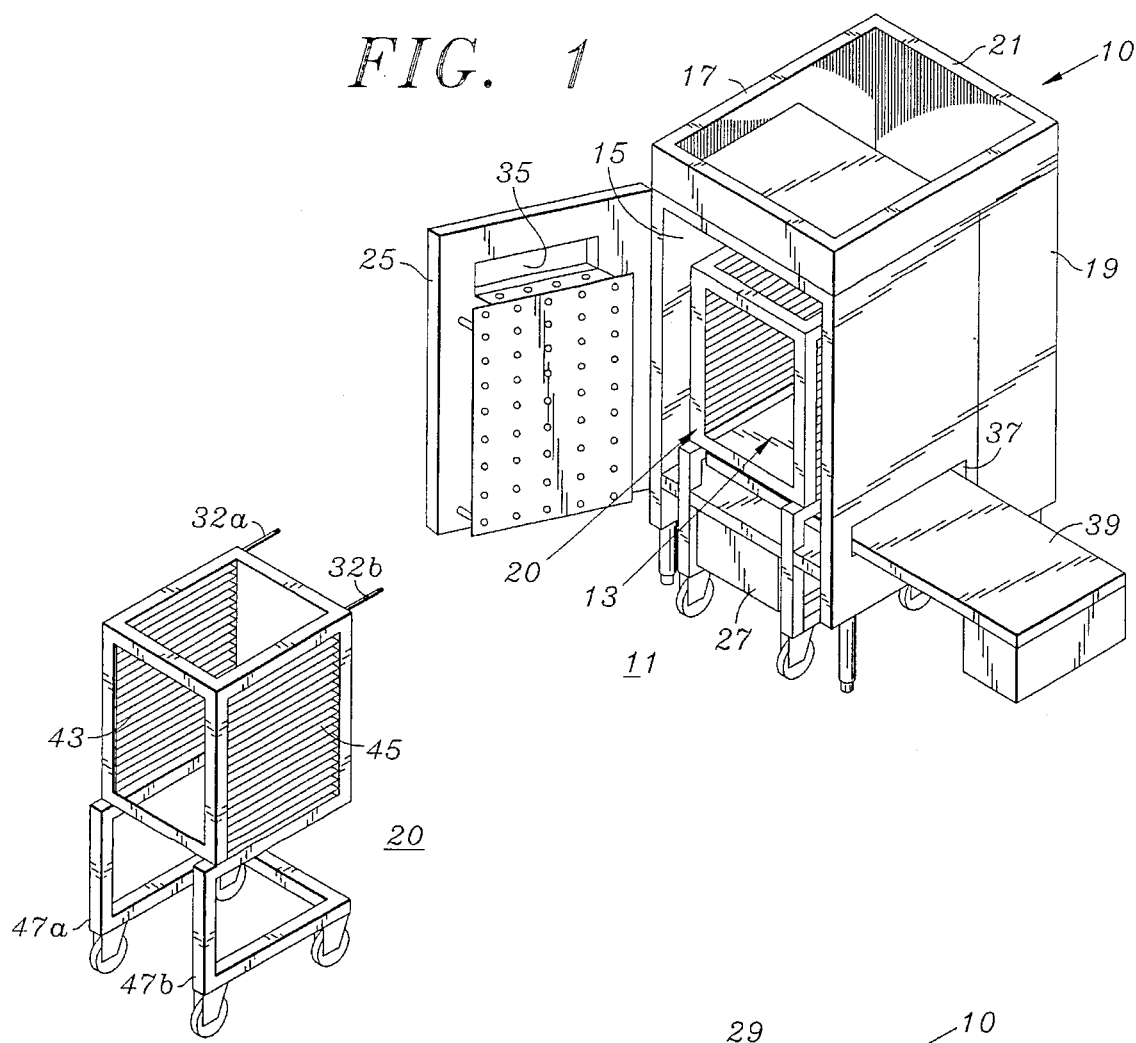
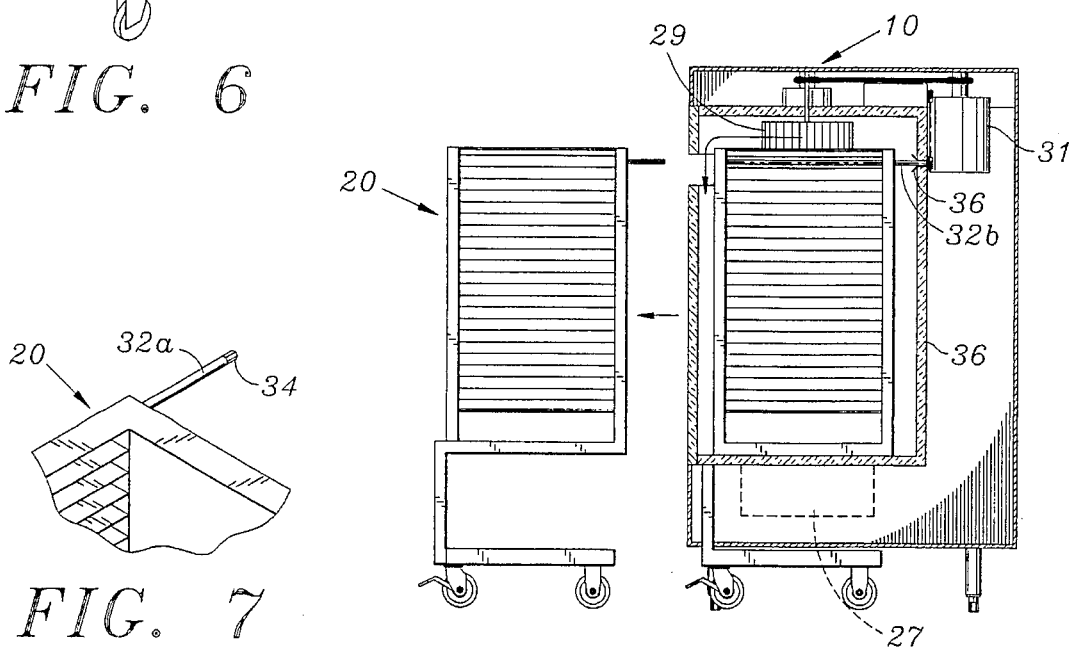

VERTICAL OVEN

BACKGROUND OF THE INVENTION

The present invention relates to ovens, and more particularly, to improvements in vertical conveyorized ovens to allow more effective heating and operation.

Commercial ovens are available to perform a variety of broiling, baking or toasting functions. Given the commercial setting, such ovens are designed to perform those functions in a manner to efficiently satisfy volume requirements, on a predictably repeatable basis. Preferably the quality of the products produced in those ovens can be controlled and maintained at desired standards independent of the particular operating personnel, whose operating habits may vary significantly even for a given establishment. Additionally, the commercial oven is preferably constructed so as to facilitate internal and external cleaning to insure healthfulness of the products cooked in the oven and satisfaction of applicable health and safety codes. A further consideration relates to the space and bulk requirements of the oven. Preferably the oven should be easily transportable and require as little space as possible, while satisfying production requirements.

Conveyorized ovens generally offer a more regulated approach to cooking. Products are ideally placed on a conveyor at a given point, and are transported through the conveyor at a predetermined speed, to a predetermined unloading point. Most such conveyors are horizontally oriented and are therefore bulky, consume significant floor space and require substantially permanent installation. They are therefore not usable in many restaurants, particularly where the original kitchen design did not contemplate inclusion of such a horizontal conveyorized oven.

Another, somewhat less apparent problem, associated with such horizontal conveyor systems relates to variations in operating procedures and resulting product specifications. Those familiar with such ovens recognize that operators, particularly when pressured by a rush of business, frequently load products closer to or beyond the oven entrance, and remove products closer to or before the oven exit. As a consequence, baking cycles and the product specifications tend to vary even for a given oven with constant operating control settings. Horizontal conveyorized ovens also require significant effort in order to clean and maintain. Accordingly, while such horizontal conveyorized ovens are capable of performing production cooking functions, they suffer significant limitations.

Spiral-type cooking ovens advantageously require less floor space than horizontal conveyors ovens. However, as with horizontal conveyor ovens, production capacity is limited by end to end sizing of the products. Uniformity of heat flow through the spiral oven is typically another concern. Moreover, many such spiral-type ovens incorporate support and drive structures within the central heating area of the oven. That construction may cause maintenance problems and render necessary cleaning and maintenance more difficult.

As with spiral-type ovens, vertical conveyorized ovens require less floor space than horizontal ovens. However, in vertical ovens production space is not limited by end-to-end sizing of the product. Thus, given that the thickness of products, such as pizzas, is relatively small, more products may be simultaneously cooked within a small vertical oven than in a far larger horizontal conveyorized oven.

One such vertical conveyorized oven is described in U.S. Pat. No. 5,030,809 to Buday for vertical oven. The vertical oven described in that patent describes a production heating system that can efficiently bake a significant number of products, and yet be easy to clean and maintain. While the vertical oven disclosed in U.S. Pat. No. 5,030,809 provides significant advantages over prior conveyorized ovens, the need for further improvements has been recognized in order to improve the air flow within the oven and insure uniformity of bake and appearance of the finished product. As described below the present invention provides such improvements to facilitate the heated air flow within a vertical conveyorized oven. Additional improvements described herein also relate to the construction of pan trays which serve as both baking pans and oven transport trays, engageable with the vertical conveyor assembly to transport the products through the vertical oven. The present invention further provides for simultaneous regulation of the heated air circulation and conveyor speed in order to obtain optimum product specifications.

SUMMARY OF THE INVENTION

An improved vertical conveyor oven is provided which facilitates the flow of heated air within the oven. The oven includes a housing having a first open end, side walls and a rear wall. An access door secured to the housing at the housing first open end. A perimeter ducting system is formed within the housing, defining an interior heating chamber. The ducting system includes a first portion disposed about and extending inwardly from the housing side walls and rear wall, and a second portion disposed upon and extending inwardly from the access door. A combustion chamber is provided within the housing below the interior heating chamber. A heat circulation fan is provided within the housing above the interior heating chamber. The heat circulation fan operates to draw heated air from the combustion chamber upward through the heating chamber and downward between the ducting system and the housing, exterior to the heating chamber.

The combustion chamber air vent is provided within the housing intermediate the combustion chamber and the heating chamber. The air vent is perforated to allow heated air to flow from the combustion chamber into the heating chamber.

A vertical conveyor assembly may be provided which is retractably disposable within the housing for receiving and vertically transporting products within the heating chamber.

The conveyor assembly and combustion chamber air vent may be formed such that the conveyor assembly cart supports are received within notches formed within the combustion chamber air vent to allow the oven access door to be closed while the vertical conveyor assembly remains within the oven.

The vertical conveyor assembly drive mechanism may be disposed external to the housing, for imparting motion to the vertical conveyor assembly. A drive member extending through the housing to engage the vertical conveyor assembly. The vertical conveyor assembly drive mechanism may thereby be thermally isolated from the interior of the oven. The oven may be provided with a load slot for inserting products and an exit slot for withdrawing products after they are heated.

Pans may be specially provided for use in connection with the oven. The pans preferably include a central recessed portion for receiving products to be heated and edge portions for engaging the vertical conveyor assembly. The pan edge portions are engageable with the conveyor assembly adjacent the load slot and releasable from the conveyor assembly adjacent the exit slot. Thereafter, the pans may be transported out of the oven via a horizontal take out conveyor assembly.

The ducting system is preferably formed of a plurality of perforated walls formed to allow heated air from the circulation fan to be drawn into the heating chamber. The heat circulation fan preferably comprises a centrifugal swirl cage blower and the combustion chamber preferably comprises a gas heater.

Control systems may be provided to regulate fan speed, conveyor speed and combustion chamber operating temperature. Programmable control circuitry may be provided for simultaneously regulating fan speed, conveyor speed and operating temperature, in response to input signals representative of desired product specifications.

BRIEF DESCRIPTION OF THE DRAWINGS

FIG. 1 is a front perspective view of a conveyorized vertical oven with the conveyor assembly in place within the oven;

FIG. 5 is a side sectional view of the conveyorized vertical oven;

FIG. 6 is a front perspective view of the conveyor assembly removed from the oven;

FIG. 7 is an enlarged sectional view of the conveyor assembly and drive shaft;

FIG. 8b is a front sectional view of the pan tray of FIG. 8a;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

Figure 2:
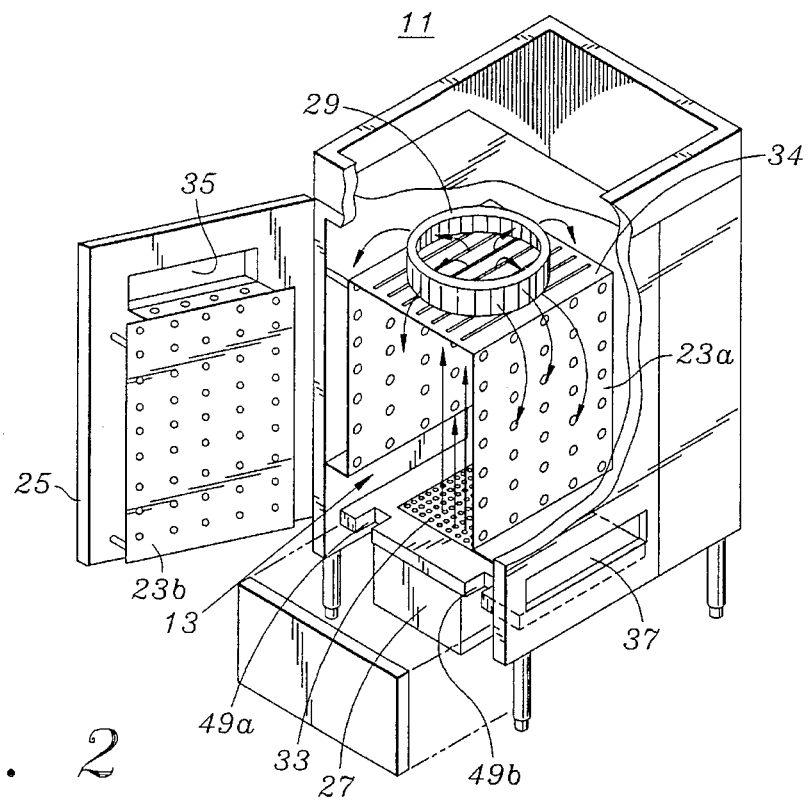
FIG. 2 is a front perspective view of the oven showing the internal ducting.

Referring to FIG. 1, a front perspective view of the conveyorized vertical oven 11 is shown with the conveyor assembly 20 in place within the oven housing 10. The oven housing is formed to have a first open end 15, side walls 17, 19 and rear wall 21. An access door 25 is secured to the housing at about the first open end 15. A perimeter ducting system is provided within the housing, defining an interior heating chamber 13. As shown in FIG. 2, the perimeter ducting system includes a first portion 23a disposed about and extending inwardly from the housing side walls and rear wall. The perimeter ducting system also incorporates a second portion 23b disposed upon and extending inwardly from the access door 25.

Figure 3:
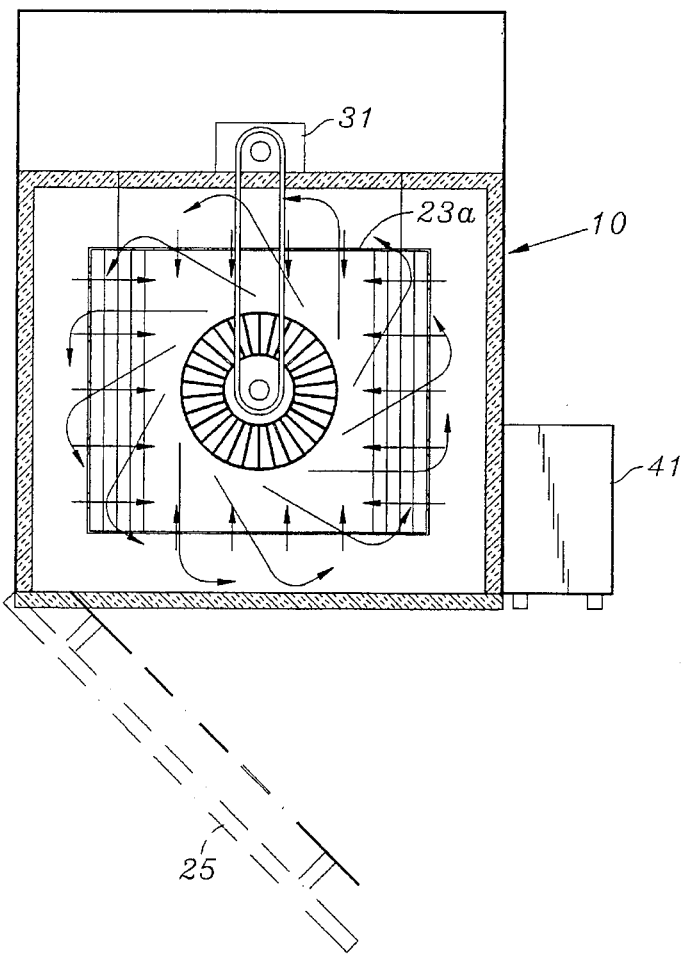
FIG. 3 is a top sectional view of the oven illustrating air flow about the ducting system.

A combustion chamber 27 is disposed within the housing 10, below the interior heating chamber 13. The heat circulation fan 29 is provided within the housing 10, above the interior heating chamber 13. As shown in connection with FIGS. 2 and 3, the heat circulation fan 29 is operative to draw heated air from the combustion chamber 27 upward through the heating chamber 13 and downward between the ducting system 23a, b and the housing 10, exterior to the heating chamber 13.

Figure 4:
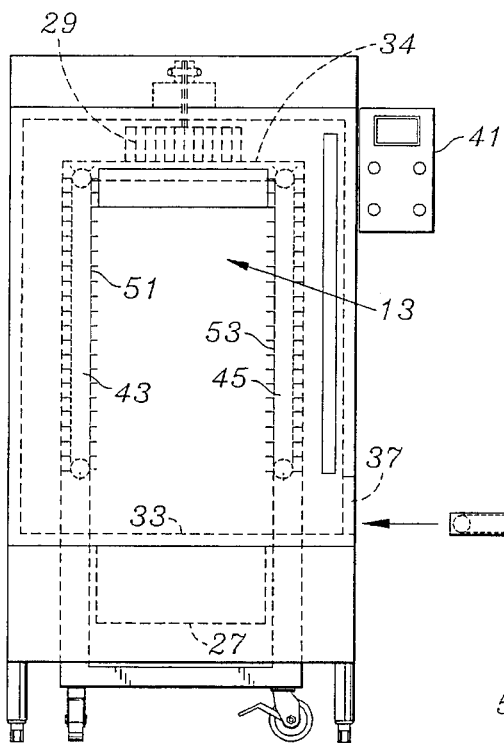
FIG. 4 is a front sectional view of the conveyorized vertical oven.

As shown at FIGS. 2 and 4, a combustion chamber air vent 33 is provided within the housing intermediate the combustion chamber 27 and the heating chamber 13. The air vent 33 is preferably formed as a flat perforated member allowing heat flow from the combustion chamber into the heating chamber. A diffuser plate 34 is further provided intermediate the heat circulation fan 29 and the heating chamber 13. The diffuser plate 34 is preferably formed as a flat member having a plurality of longitudinal apertures formed therein. The diffuser plate 34 operates to diffuse air flow drawn towards the fan 29 from the heating chamber 13.

In the presently preferred embodiment the combustion chamber 27 is formed as a gas heater and the heat circulation fan 29 is formed as a centrifugal squirrel cage blower. Suitable blower wheels for this application include the centrifugal blower wheels marketed by SHERIDAN-SWIFT MANUFACTURING, a division of UNITED TECHNOLOGIES AUTOMOTIVE, of Wauseon, Ohio. As one of ordinary skill in the art will recognize, the precise construction of the combustion chamber and the heat circulation fan may be modified or substituted without departing from the broader aspects of the present invention. For example, the combustion chamber may be implemented as an electrical heater and different types of fan mechanisms may be utilized in place of the centrifugal squirrel cage blower.

Similarly, the construction of the ducting system may vary significantly within the broader aspects of the present invention. Though disclosed as an arrangement of perforated walls, the ducting system may alternately be formed in a variety of different shapes, and/or incorporate different aperture patterns in order to facilitate the particular application at hand.

As shown at FIG. 2, the oven 11 is preferably provided with load slot 35 and exit slot 37. Load slot 35 facilitates the introduction of products into the oven 11, and may be sized to receive a horizontal loading conveyor. Similarly, exit slot 37 facilitates the discharge of products from the oven 11, and may be sized to receive a horizontal take out conveyor 39, as shown at FIGS. 1 and 4.

Referring to FIGS. 5, 6 and 7, wherein the construction of the vertical conveyor assembly 20 is shown in more detail. As shown at FIG. 5, the conveyor assembly is constructed to permit retractable insertion within the housing 10. The conveyor assembly 20 is formed to be simply rolled into the ho using 10 in a manner to facilitate engagement of conveyor assembly drive mechanism 31, disposed external to the housing 10 connecting drive members 32a, b extend from the vertical conveyor assembly 20 through the housing wall to the conveyor assembly drive mechanism 31. In the presently preferred embodiment the drive members 32a, b formed as an indexing shaft having a hex shaped head receivable within a cone shaped coupling guide to facilitate easy insertion and indexing of the connecting drive member to the vertical conveyor assembly drive mechanism.

In the presently preferred embodiment a layer of insulating material 36 may be disposed within the housing 10 to thermally isolate the conveyor drive mechanism from the oven heating chamber. The insulating material may be formed of commercially available material such as powder/fiber mixtures formed into standard panels sold by companies such as MICROTHERM, INC., of Prospect Heights, Illinois.

Referring again to FIG. 6, the vertical conveyor assembly 20 may be formed of first and second horizontally spaced conveyor driven mechanisms 43–45. The driven mechanisms 43–45, are driven by the drive members 32a, b and are synchronized to support opposite ends of pans vertically transported within the oven. The driven mechanisms 43–45 may be formed to include a plurality of support members 51, 53, secured to and translating about conveyor driven mechanisms. The support members 51, 53 are formed to receive and support pans vertically traversing within the oven 11.

Figure 8A:
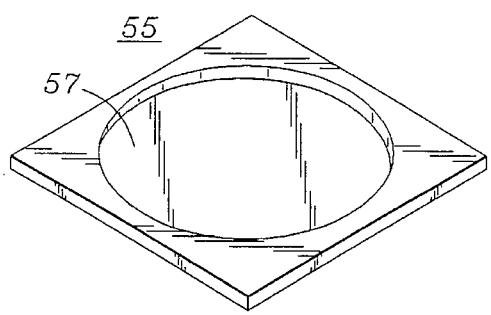
FIG. 8a is a front perspective view of a pan tray engageable with the conveyor mechanism.
Figure 8B:
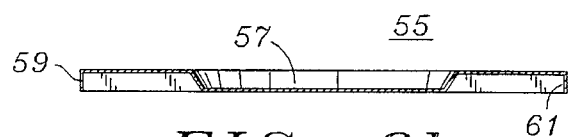

FIGS. 8a and 8b illustrate the construction of a pan suitable for use in connection with the present invention. As shown therein pan 55 is formed to include a central recessed portion 57 for receiving products to be heated, and edge portions 59, 61 for engaging the support members 51, 53 of the vertical conveyor assembly 20. The edge portions 59, 61 are engageable with the vertical conveyor assembly adjacent the load slot and releasable from the vertical conveyor assembly adjacent the exit slot. As the pan 55 is released from the vertical conveyor assembly 20, the pan may be transported out of the oven housing by horizontal takeout conveyor 39.

Referring to FIG. 4, control mechanism 41 is constructed to incorporate a fan speed control circuit, a vertical conveyor assembly speed control circuit, and a combustion chamber temperature control circuit. The controller 41 if operative to independently regulate the speed of the heat circulation fan, the transport speed of the vertical conveyor assembly and the operating temperature of the combustion chamber. Each of those may be separately regulated as desired. Alternately, control 51 may incorporate preprogrammed circuitry for simultaneously regulating fan speed, conveyor speed, and combustion chamber temperature in response to input signals representative of desired product specifications. Thus, for example, input signals representative of a particular product, e.g. a deep dish pizza, may automatically trigger preprogrammed speed and temperature levels in order to heat the product to one or more desired characteristic settings.

As will be recognized by one of ordinary skill in the art that controller 41 may be constructed to perform different or additional control functions within the broader aspects of the invention.

Figure 9A:
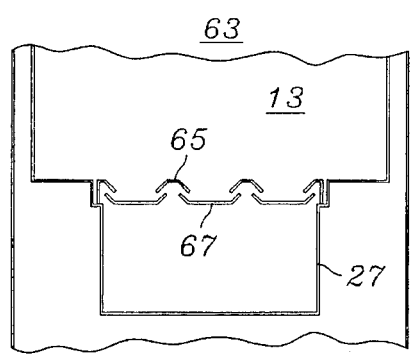
FIG. 9a is a front sectional view illustrating an alternate embodiment of the combustion air vent.

FIG. 9a illustrates an alternate embodiment of the combustion air vent 33, shown at FIG. 2. In the embodiment shown in FIG. 9a, the combustion air vent is configured as an assembly incorporating base portion 67 and upper portion 65. Air flow from the combustion chamber 27 is directed intermediate portions 65 and 67 to further facilitate distribution of the combustion air flow in the heating chamber 13. In the embodiment shown at FIG. 9a the combustion air vent assembly is constructed as a fixed member wherein the relative positions of portion 65 and 67 are fixed upon manufacture.

Figure 9B:
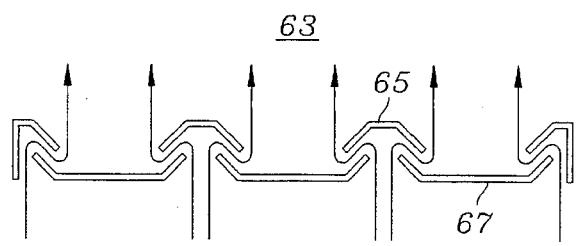
FIG. 9b is an enlarged front sectional view showing a further alternate embodiment of the combustion air vent.

The embodiment illustrated at FIG. 9b is similar to that previously described and illustrated in connection with FIG. 9a. However, in the embodiment at FIG. 9b portion 65 is vertically translatable with respect to portion 67. As will be apparent to one of ordinary skill, vertical movement of portion 65 regulates air combustion air flow from the combustion chamber to the heating chamber. The vertical position of upper portion 65, and thereby the space through which the combustion air may flow into the heating chamber, is regulated in accordance with the particular application and desired product characteristics.

It will further be apparent to one of ordinary skill in the art that the particular shape and construction of the combustion air vent assembly, as well as the mechanism for providing control capacity for operation of the combustion vent assembly, may be varied as convenient within the broader aspects of the present invention.

What is claimed is:

1. A conveyorized oven for heating products as they traverse vertically within the oven comprising:

an oven housing having a first open end, side walls and a rear wall;

an access door secured to the housing at the housing first open end;

a perimeter ducting system formed within said housing, defining an interior heating chamber, said ducting system having a first portion disposed about and extending inwardly from said housing side walls and said rear wall, and a second portion disposed upon and extending inwardly from said access door;

a combustion chamber disposed within the housing below the interior heating chamber; and a heat circulation fan disposed within the housing above the interior heating chamber, said heat circulation fan being operative to draw heated air from the combustion chamber upward through the heating chamber and downward between the ducting system and the housing, exterior to the heating chamber.

2. The oven as resulted in claim 1 further comprising:

a vertical conveyor assembly retractably disposable within the oven for receiving and vertically transporting products within the heating chamber.

3. The oven as recited in claim 1 further comprising:

a combustion chamber air vent disposed within the housing intermediate the combustion chamber and the heating chamber, said air vent being perforated to allow heated air to flow from the combustion chamber into the heating chamber.

4. The oven as recited in claim 3 wherein the conveyor assembly includes a pair of vertical conveyor cart supports; and wherein the combustion chamber air vent is formed to include a pair of notches for receiving the vertical conveyor cart supports such that the oven access door may be closed while the conveyor assembly remains within the oven.

5. The oven as recited in claim 2 further comprising a vertical conveyor assembly drive mechanism disposed external to said housing for imparting motion to said vertical conveyor assembly.

6. The oven as recited in claim 5 wherein the vertical conveyor assembly further comprises at least one connecting drive member extending from the vertical conveyor assembly and extendable substantially through the oven housing to engage the vertical conveyor assembly drive mechanism.

7. The oven as recited in claim 5 wherein said vertical conveyor assembly drive mechanism is thermally isolated from the oven heating chamber.

8. The oven as recited in claim 2 wherein the vertical conveyor assembly comprises first and second horizontally spaced conveyor driven mechanisms, said first and second conveyor driven mechanisms being synchronized to support opposite ends of pans being vertically transported within the oven.

9. The oven as recited in claim 8 wherein each of said first and second conveyor driven mechanisms have a plurality of support members secured to the surface thereof, said support members being formed to receive and support pans vertically traversing within the oven.

10. The oven as recited in claim 2 further comprising an exit slot formed in one of the oven side walls for allowing heated products to be withdrawn from the oven.

11. The oven as recited in claim 10 further comprising a load slot formed in one of the oven side walls to allow products to be inserted into the oven.

12. The oven as recited in claim 11 further including at least one pan retractably engageable to the vertical conveyor assembly, said pan including a central recessed portion for receiving products to be heated and edge portions for engaging the vertical conveyor assembly, said edge portions being engageable with the vertical conveyor assembly adjacent the load slot and being releasable from the vertical conveyor assembly adjacent the exit slot.

13. The oven as recited in claim 12 further comprising a horizontal take-out conveyor extending into the oven housing through the exit slot for receiving pans as they are released from the vertical conveyor assembly, and thereafter horizontally transport the pans out of the oven housing.

14. The oven as recited in claim 1 wherein the ducting system comprises a plurality of perforated walls formed to allow air flow from the heat circulation fan to be drawn into the heating chamber.

15. The oven as recited in claim 1 wherein the heat circulation fan comprises a centrifugal squirrel cage blower.

16. The oven as recited in claim 1 wherein the combustion chamber comprises a gas heater.

17. The oven as recited in claim 2 wherein said vertical conveyor assembly is retractable from said oven without removing said ducting system.

18. The oven as recited in claim 2 wherein said ducting system and said vertical conveyor assembly are removable from said housing without removal of said vertical conveyor assembly drive mechanism.

19. The oven as recited in claim 1 further including a fan speed control circuit for regulating the speed of said heat circulation fan.

20. The oven as recited in claim 1 further comprising a vertical conveyor assembly speed control circuit for regulating the speed of said vertical conveyor assembly.

21. The oven as recited in claim 1 further comprising a combustion chamber temperature control circuit for regulating the operating temperature of the combustion chamber.

22. The oven as recited in claim 1 further comprising programmable control circuitry for simultaneously regulating heat circulation fan speed, vertical conveyor assembly speed, and combustion chamber operating temperature in response to input signals representative of desired product specifications.

* * * * *